United States Patent

[11] 3,624,171

[72] Inventors Charles V. Goebel, Jr.
   Corte Madera;
   Louis L. Ferstadig, El Cerrito, both of Calif.
[21] Appl. No. 651,064
[22] Filed May 16, 1967
[45] Patented Nov. 30, 1971
[73] Assignee Chevron Research Company
   San Francisco, Calif.
   Original application Apr. 7, 1964, Ser. No. 358,079, Pat. No. 3,329,704. Divided and this application May 16, 1967, Ser. No. 651,064
   The portion of the term of the patent subsequent to July 3, 1984, has been disclaimed.

[54] PROCESS FOR THE PRODUCTION OF 1,8-DIBROMOOCTANE
   3 Claims, No Drawings

[52] U.S. Cl. .................................................. 260/663,
   260/465.8, 260/681.5
[51] Int. Cl. ........................................................ C07c 17/08
[50] Field of Search ........................................... 260/663

[56] References Cited
   UNITED STATES PATENTS

| | | | |
|---|---|---|---|
| 3,329,704 | 7/1967 | Goebel, Jr. et al. | 260/465.8 |
| 2,303,362 | 12/1942 | Jessup | 260/663 X |
| 2,563,050 | 8/1951 | Linn et al. | 260/663 |
| 3,005,845 | 10/1961 | Bain | 260/663 X |

FOREIGN PATENTS

| | | | |
|---|---|---|---|
| 453,541 | 12/1948 | Canada | 260/663 |
| 1,134,362 | 8/1962 | Germany | 260/663 |

OTHER REFERENCES

Ashley et al., " Chem. Abstracts," Vol. 53, p. 7,067 (1959).

*Primary Examiner*—Daniel D. Horwitz
*Attorneys*—A. L. Snow, F. E. Johnston, G. F. Magdeburger and D. L. Hagmann

ABSTRACT: 1,8-dibromooctane is prepared from a cyclooctene vapor phase heart-cut thermal crackate in a process which includes sulfuric acid treating, and hydrobromination under free radical catalysis at temperatures in the range $-10°$ to $40°$ C.

PROCESS FOR THE PRODUCTION OF 1,8-DIBROMOOCTANE

This application is a division of application Ser. No. 358,079 filed Apr. 7, 1964, now U.S. Pat. No. 3,329,704.

This invention relates to a process for the production of 1,8-dibromooctane. More particularly, it relates to a process for the production of 1,8-dibromooctane in which a treated cyclooctene vapor phase thermal crackate is converted to substantially pure 1,8-dibromooctane by the addition of hydrogen bromide to an acid-treated cyclooctene crackate in the presence of a di-t-alkyl peroxide catalyst at low temperature.

Cyclooctene is known to be cleaved under vapor phase thermal cracking conditions. The resulting product mixture upon distillation yields a cyclooctene heart-cut crackate of substantial purity, 97 percent and higher, which is useful as an intermediate for many purposes. Despite its high purity, however, it has been found to respond poorly when used for a free radical catalyzed addition of hydrogen bromide thereto. Normally a pure diolefin feed can yield from about 95 to 100 percent primary alkyl bromide. The 97 percent pure cyclooctene crackate, however, yields only about 75 percent primary dibromide, with the balance being 1,7- and 2,7-dibromooctane and tarry byproduct. All or a portion of the 3 percent impurity appears to be promoting at least a corresponding 7-fold byproduct formation.

It has now been found that liquid phase contacting of heart-cut vapor phase cyclooctene crackate with 88 to 97 percent sulfuric acid at a temperature below about 10° C. effectively destroys trace impurities responsible for interfering byproduct-forming reactions when the untreated crackate is reacted under catalytic-free radical conditions with hydrogen bromide. For each volume of feed, about 0.005 to 0.05 volume of the acid is used. After no more than about 10 minutes contact time, the acid phase is separated from the diene hydrocarbon which may then be effectively converted to the desired dibromide in an essentially quantitative yield.

1,8-Dibromooctane is especially useful as an intermediate in the preparation of sebaconitrile, α,ω-decamethylenediamine, sebacic acid and 1,8-dihydroxyoctane.

By cyclooctene heart-cut crackate is meant, in general, the thermally cracked cyclooctene product as obtained from the vapor phase thermal cracking of cyclooctene at a temperature in the range 520° to 575° C., preferably at about 530° to 550° C., as a result of rather short contact times, preferably less than about 15 second which has been topped by distillation to remove components boiling at 1 atmosphere below about 96° C.

By catalytic-free radical generating conditions in the present context is meant, in general, the contacting of hydrogen bromide with an alkadiene in the liquid phase in the presence of a homolytically dissociable organic compound at dissociation temperatures in the range from about −10° to about 40° C. and the equivalent.

In accordance with the present inventive process, 1 liquid volume of heart-cut crackate is contacted efficiently with from about 0.005 to 0.05 volumes of about 90 percent aqueous sulfuric acid. The contacting is for a reasonable short period — for less than about 10 minutes and, preferably, for less than 5 minutes — in view of the reactive nature of diene hydrocarbons.

The sulfuric acid-treated liquid hydrocarbon phase is then separated from the acid phase and washed. Preferably, the washing is accomplished by two water and one dilute aqueous alkali washes, for example, 5 percent aqueous sodium hydroxide solution or the equivalent, which is applied intermediate the two water washes. While the treated crackate may be directly used for many purposes, it is preferably given at least a flash distillation to remove trace amounts of high molecular weight polymer.

For conversion of the treated cyclooctene crackate to 1,8-dibromooctane, gaseous hydrogen bromide is introduced into the liquid-treated crackate in the presence of a di-t-alkyl- peroxide, preferably di-t-butylperoxide, while the temperature of the reaction mixture is maintained below about 40° C., preferably below about 25° C. but above about −10° C. Although di-t-alkyl peroxides are remarkably stable towards heat and acids, normally being useful as free radical reaction initiators at temperatures above 100° C., i.e., in the range of 100° to 180° C., they are excellent catalysts for the addition of hydrogen bromide to cyclooctene crackate at temperatures as low as 0° C. and lower. This is especially surprising, in view of the fact that it is known to produce these peroxides in the presence of hydrogen bromide catalyst at much higher temperatures.

Other free radical reaction initiating catalysts may be used in the present process including organic hydroperoxidic, organic azocompounds, as well as free radical generation in the reaction medium by radiant energy irradiation including high-energy, high-frequency vibrational means, light, electron bombardment and the like. Particularly preferred is the use of di-t-alkyl peroxides as the precursor radical reaction initiating compounds.

In general, hydrogen bromide additions are complete after from about 15 minutes to 8 hours, depending upon the particular free radical catalyst, rate of hydrogen bromide introduction to the reaction zone and temperature. Using di-t-butyl peroxide, having at least a small excess of hydrogen bromide present and at a temperature of 0° C., a reaction time of about 2 hours is usual. At 25° C., with other conditions being as above, the reaction time required for essentially complete conversion is only about 15 minutes.

Reaction temperatures appreciably above about 25° C. are undesirable, because ionic side reactions begin to be increasingly favored at higher temperatures. Completion of the reaction is conveniently determined by noting when there is no further sensible takeup of gaseous hydrogen bromide by the reaction medium as by inlet-exit gas flowmeter comparisons and the like.

In the present process, the crude dibromide, as produced above, may be used directly as an intermediate chemical feed for the production of sebaconitrile, sebacic acid and the like.

Representative di-t-alkyl peroxidic organic free radical precursor compounds useful for the initiation of hydrogen bromide addition to the treated cyclooctene crackate of the present process are di-t-butyl, di-t-amyl, di-1,1-dimethylbutyl, di-1,1-dimethyloctyl, di-1,1-dimethylhexadecyl, di-1,1-dimethyloctadecyl and the like, that is, lower ditertiary-alkyl peroxides as in the general formula:

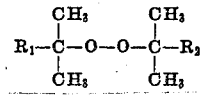

wherein $R_1$ and $R_2$ are alkyl groups having from one to 18 carbon atoms and may be the same or different groups.

Other organic peroxidic catalysts useful in the process are benzoyl peroxide, lauroyl peroxide, bis-p-chlorobenzoyl peroxide, di-1-naphthoyl peroxide, t-butyl hydroperoxide, methyl ethyl ketone hydroperoxide, t-butyl perbenzoate, cumene hydroperoxide, cyclohexyl hydroperoxide, diisopropyl-peroxydicarbonate, 2-azobisisobutyronitrile, 2,2′-azobisisobutyronitrile, decalin hydroperoxide and the like.

Effective catalytic amounts of these and the above-noted preferred organic free radical initiators useful in the process vary but in general are in the range 0.1 to 10 mol percent based upon the crackate feed.

Example 1

A heart-cut aliquot (98.5 parts) of liquid cyclooctene crackate having a boiling point range of 118° to 121° C. at 760 mm. of Hg pressure was thoroughly mixed with 1.5 parts of 90 percent aqueous sulfuric acid (10 parts $H_2O$:90 parts $H_2SO_4$) while maintaining the temperature of the resulting mixture below about 5° C. After less than 5 minutes contact time, the crackate was separated from the acid phase by decantation and the hydrocarbon was washed with water, 5 percent aqueous sodium hydroxide solution and again fresh water. After drying, the crackate was flash distilled, leaving a small amount of polymeric bottoms, i.e., 1,7-octadiene recovery was greater than about 96 percent.

HYDROBROMINATION

Example 2

In a closed reactor system having a gas inlet and outlet fitted for stirring and temperature control, separate aliquots of the treated and untreated cyclooctene crackate of example 1 were contacted with essentially anhydrous hydrogen bromide as follows:

|  | Treated | Untreated |
|---|---|---|
| Volume, ml. | 50 | 50 |
| Temperature, °C. | 25 | 25 |
| Di-t-butylperoxide catalyst, % (wt.) | 2 | 2 |
| Reaction time (100% conversion), min. | 20 | 30 |
| Product, % |  |  |
| 1,8-dibromooctane | 96 | 75 |
| Secondary dibromooctanes | 4 | 25 |

When the treated diolefin feed was hydrobrominated at about 0° C., the conversion was quantitative and the product was for all practical purposes 100 percent 1,8-dibromooctane.

From the foregoing examples, it is seen that the sulfuric acid treatment essentially completely eliminates the catalytic material responsible for byproduct formation in the addition of hydrogen bromide to the cyclooctene crackate feed. Reaction times for the treated feed are 33⅓ percent faster, and the product is of a premium reagent grade.

For the satisfactory treatment of the crackate, small amounts of water appear to be required in the sulfuric acid. On the other hand, large amounts of water in the acid, i.e., of the order of 15 percent and more, appear to favor polymerization and isomerization of the diene. In general, about 88–97 percent sulfuric acid is useful. Preferably, from about 0.5 to 5 parts per 100 parts of diene and 90–95 percent sulfuric acid are employed in the treatment at liquid phase contacting temperatures below about 10° C. and above the freezing point of the mixture.

The advantages of the present process are further illustrated in the following example where the resulting dibromide was converted to nitrile as follows:

CYANOLYSIS

Example 3

Aliquots of hydrobrominated, treated and untreated crackate feed were analogously converted as described in the following section, and the corresponding nitrile product recovered:

|  | Crackate Feed | |
|---|---|---|
|  | Treated | Untreated |
| Dibromide Conversion, % | 100 | 100 |
| Product, % |  |  |
| Sebaconitrile | 100 | 75 |
| Nonenitriles | — | 25 |

The foregoing data show that the untreated crackate feed is unsatisfactory for sebaconitrile production.

In making the above conversion of the noted dibromide feeds to nitrile it was necessary to employ particular high molecular weight α,ω-dibromo-alkane solvolytic conditions.

CYANOLYTIC MEDIA

Example 4

Satisfactory results in the cyanolysis of 1,8-dibromooctane are contingent upon the use of a particular type solvent medium. This is demonstrated in the runs listed in table I following, carried out under the following conditions:

| Temperature | Reflux |
|---|---|
| 1,8-Dibromooctane, g. | 10 |
| Sodium cyanide, g. | 3.6 |
| Solvent, ml. | 10 |

TABLE I

| Run | Solvent | Time (100% Conversion) | Remarks |
|---|---|---|---|
| 1. | Methanol | 6 hrs. | — |
| 2. | Aqueous Ethanol (66%) | 1.5–2 | — |
| 3. | Aqueous Ethanol (50%) | — | No apparent reaction |
| 4. | Dimethylsulfoxide | — | Reactants decomposed |
| 5. | Ethylene glycol | — | Reactants decomposed |
| 6. | Aqueous Ethanol (95%) | 5 | — |
| 7. | Aqueous i-Propanol (95%) | 8 | — |
| 8. | i-Propanol | 8 | — |

Satisfactory solvents for the cyanolysis of 1,8-dibromooctane are, in general, water-lower carbinol mixtures. At least about 1 weight percent of water must be miscible in the carbinol in the cyanolysis temperature range, i.e., from about 25°–150° C. Ethanol is preferred. By lower carbinol, ROH, is meant carbinols in which R is, in general, n-alkyl, cycloalkyl, branched-chain alkyl and the like having from one to about 10 carbon atoms per alkyl group.

In general, miscible carbinol-water cyanolysis media useful in the process should contain from about 1–45 parts of water per 100 parts of the medium. Preferably, water contents are in the range 10–45 parts per 100.

In addition to the carbinols listed in table I above, others which may be used are t-butanol, cyclohexanol, isobutanol, pentanols and the like.

By high molecular weight α,ω-dibromoalkane cyanolysis conditions is meant the contacting for periods of from 0.1 to 8 hours of 1,8-dibromooctane or a higher dibromoalkane analog up to about a $S_{16}$ molecular weight with a monovalent cationic cyanide in the presence of a miscible lower carbinol-water cyanolysis mixture at a temperature in the range 25°–150° C. in which the relative amount of cyanide salt and organic dibromide is of the order of the stoichiometric requirement up to about 1.5 fold excess of salt. The above solvent mixture necessarily has from about 1–45 parts of water per 100 parts of said cyanolysis mixture.

Under the above conditions, reaction times of from 20 minutes or less up to about 2.5 hours are enjoyed. Otherwise, no appreciable conversion or reaction times of at least 5 hours and longer result.

Under preferred high molecular weight, i.e., from about $C_8$ to $C_{16}$ weight range, α,ω-dibromoalkane cyanolysis conditions, from at least a stoichiometric up to about 10 mol percent excess amount of an alkali metal cyanide, for example, sodium cyanide, is contacted with the dibromoalkane in the presence of about a 57 percent aqueous ethanolic solvent (i.e., 67 volumes of ethanol plus 43 volumes of water).

The shorter reaction times obtain when the reaction is accomplished in a pressure autoclave, for example, at about 100° C., and the longer, 2.5 hours reaction time, obtains when atmospheric pressure reflux temperatures are maintained.

The above cyanolysis examples demonstrate that higher molecular weight normal α,ω-alkadienes can be efficiently converted to α,ω-dicyanoalkanes under the hydrobromination and cyanolysis conditions of the present process. By higher molecular weight alkadienes is meant those normal dienes of molecular weights reasonably approximate to 1,7-octadiene, such as 1,7-octadiene, 1,8-nonadiene, 1,9-decadiene, 1,10-undecadiene on up to about 1,15-hexadecadiene and mixtures thereof.

The foregoing descriptive embodiments of the present invention are illustrative only. It is not the intent that the invention shall be construed as limited to the details of the above description, except insofar as such limitations have been included in the terms of the following claims.

We claim:

1. Process for the production of 1,8-dibromooctane from a cyclooctene vapor phase heart-cut thermal crackate which comprises:
    a. liquid phase contacting at a temperature below about 10° C., 1 volume of said crackate with 0.005–0.05 volume of about 88–97 percent sulfuric acid for a period less than about 5 minutes;
    b. separating said acid-contacted crackate from the resulting acid phase;
    c. hydrobrominating said acid-contacted crackate by contacting it with hydrogen bromide at a temperature in the range −10 to 40° C. and with a peroxidic catalyst under catalytic free radical generating conditions for a period in the range from 0.25 to 8 hours, thereby converting said crackate to 1,8-dibromooctane.

2. The process of claim 1 wherein said treated crackate is distilled prior to said hydrobromination.

3. The process of claim 1 wherein said free radical generating conditions involve the use of catalytic amounts of lower ditertiary-alkyl peroxides of the general formula:

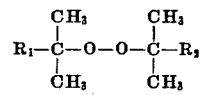

wherein $R_1$ and $R_2$ are alkyl groups having from one to 18 carbon atoms.

* * * * *